US011704001B2

(12) United States Patent
Lu et al.

(10) Patent No.: US 11,704,001 B2
(45) Date of Patent: Jul. 18, 2023

(54) METHOD AND DEVICE FOR DISPLAYING WEB PAGE CONTENT

(71) Applicant: BEIJING XIAOMI MOBILE SOFTWARE CO., LTD., Beijing (CN)

(72) Inventors: Yizhan Lu, Beijing (CN); Qing Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/394,179

(22) Filed: Apr. 25, 2019

(65) Prior Publication Data

US 2019/0332232 A1 Oct. 31, 2019

(30) Foreign Application Priority Data

Apr. 28, 2018 (CN) .......................... 201810403981.2

(51) Int. Cl.
| | |
|---|---|
| *G06F 3/0484* | (2022.01) |
| *G06F 9/451* | (2018.01) |
| *G06F 16/958* | (2019.01) |
| *G06F 40/205* | (2020.01) |

(52) U.S. Cl.
CPC ............ *G06F 3/0484* (2013.01); *G06F 9/451* (2018.02); *G06F 16/958* (2019.01); *G06F 40/205* (2020.01)

(58) Field of Classification Search
CPC ...... G06F 3/0484; G06F 9/451; G06F 16/958; G06F 40/205
See application file for complete search history.

(56) References Cited

U.S. PATENT DOCUMENTS

| 6,067,565 | A | * | 5/2000 | Horvitz | .................. H04L 29/06 709/218 |
| 6,489,974 | B1 | * | 12/2002 | Johnson | .............. G06F 3/04817 715/771 |
| 7,814,425 | B1 | * | 10/2010 | O'Shaugnessy | ..... G06Q 10/107 715/752 |
| 2003/0146939 | A1 | * | 8/2003 | Petropoulos | .......... G06F 16/338 715/810 |
| 2003/0172126 | A1 | * | 9/2003 | Brown | ................ G06F 16/9577 709/217 |

(Continued)

FOREIGN PATENT DOCUMENTS

| CN | 101082917 A | 12/2007 |
| CN | 102098234 A | 6/2011 |

(Continued)

OTHER PUBLICATIONS

Extended European search report of European Patent Application No. 19171393.2, from the European Patent office, dated Aug. 19, 2019, 7 pages.

(Continued)

*Primary Examiner* — Kavita Stanley
*Assistant Examiner* — William Wong
(74) *Attorney, Agent, or Firm* — Syncoda LLC; Feng Ma

(57) ABSTRACT

A method for displaying a web page content includes: acquiring a selection signal corresponding to a first web page address among at least one web page address displayed on a first user interface; obtaining summary information of a first web page corresponding to the first web page address, according to the first web page address; and displaying the summary information of the first web page.

14 Claims, 5 Drawing Sheets

(56) References Cited

U.S. PATENT DOCUMENTS

| | | | | |
|---|---|---|---|---|
| 2003/0187925 | A1* | 10/2003 | Inala | H04L 67/306 709/204 |
| 2004/0205514 | A1* | 10/2004 | Sommerer | G06F 40/137 715/205 |
| 2005/0160419 | A1* | 7/2005 | Alam | G06F 8/656 717/174 |
| 2005/0267870 | A1* | 12/2005 | Everett-Church | H04L 67/10 |
| 2006/0070012 | A1* | 3/2006 | Milener | G06F 3/0482 715/822 |
| 2006/0282416 | A1* | 12/2006 | Gross | G06F 16/951 |
| 2007/0143414 | A1* | 6/2007 | Daigle | G06Q 10/107 709/206 |
| 2011/0145698 | A1* | 6/2011 | Penov | G06F 40/221 715/235 |
| 2014/0095964 | A1* | 4/2014 | Mayblum | G06F 16/958 715/201 |
| 2015/0127644 | A1* | 5/2015 | Wu | G06F 16/955 707/736 |
| 2017/0230320 | A1* | 8/2017 | Knight | H04L 65/601 |
| 2017/0329859 | A1* | 11/2017 | Ploeg | G06F 16/954 |

FOREIGN PATENT DOCUMENTS

| | | |
|---|---|---|
| CN | 102831186 A | 12/2012 |
| CN | 103067248 A | 4/2013 |
| CN | 103513874 A | 1/2014 |
| CN | 103714115 A | 4/2014 |
| CN | 103793512 A | 5/2014 |
| CN | 104077292 A | 10/2014 |
| CN | 104144357 A | 11/2014 |
| CN | 104850296 A | 8/2015 |
| CN | 104866582 A | 8/2015 |
| CN | 105577518 A | 5/2016 |
| CN | 105871690 A | 8/2016 |
| CN | 107016000 A | 8/2017 |
| CN | 107526821 A | 12/2017 |
| CN | 101102255 A | 1/2018 |
| CN | 107566633 A | 1/2018 |
| CN | 107656935 A | 2/2018 |

OTHER PUBLICATIONS

David Mcritchie:"Firefox and other Browser Keyboard Shortcuts (Comparison Table)",Apr. 18, 2018 (Apr. 18, 2018), XP055611929, Retrieved from the Internet [retrieved on Aug. 8, 2019], 10 pages.
Anonymous:"How to remove/Delete All Boomarks in Google Chrome", Mar. 21, 2018 (Mar. 21, 2015), XP055611928, Retrieved from the Internet [retrieved on Aug 8, 2019], 3 pages.
Anonymous:"How to remove/Delete a Boomark in Google Chrome", Mar. 21, 2015 (Mar. 21, 2015), XP055611927, Retrieved from the Internet [retrieved on Aug. 8, 2019], 3 pages.
The first Office Action of Chinese Patent Application No. 201810403981.2, from the CNIPA, dated Dec. 3, 2020, 12 pages.
The First Examination Report (FER) of India Patent Application No. 201914016700, from the Intellectual Property India, dated Jan. 27, 2021, 7 pages.
The Second Office Action of Chinese Patent Application No. 201810403981.2, from the CNIPA, dated Sep. 3, 2021.

* cited by examiner

METHOD AND DEVICE FOR DISPLAYING WEB PAGE CONTENT

CROSS-REFERENCE TO RELATED APPLICATION

The present application claims priority to Chinese patent application No. 201810403981.2, filed Apr. 28, 2018, the entire disclosure of which is hereby incorporated by reference.

BACKGROUND

A URL (Uniform Resource Locator) is a compact representation of a method for acquiring a position of a resource and access the resource on the Internet, and is the address of a standard resource on the Internet. The URL contains a pattern (or a protocol), a server name, or IP (Internet Protocol) address, a path, and a file name, and the above information is represented by a string of characters such as letters, numbers, symbols, and the like.

SUMMARY

The present disclosure relates to the technical field of terminals, and more particularly to a method and a device for displaying a web page content.

According to a first aspect of the embodiments of the present disclosure, there is provided a method for displaying a web page content, including: acquiring a selection signal corresponding to a first web page address among at least one web page address displayed on a first user interface; obtaining summary information of a first web page corresponding to the first web page address, according to the first web page address; and displaying the summary information of the first web page.

In some alternative embodiments, the summary information of the first web page includes identification information of the first web page; wherein the step of obtaining summary information of a first web page corresponding to the first web page address also includes the sub-steps of: extracting key information in the first web page address, the key information including information associating with a publisher of a web page; and obtaining identification information corresponding to the key information in the first web page address from a first correspondence relationship, and determining the obtained identification information as the identification information of the first web page, the first correspondence relationship including a correspondence relationship between different key information and different identification information.

In some alternative embodiments, the summary information of the first web page includes identification information of the first web page; wherein the step of obtaining summary information of a first web page corresponding to the first web page address also includes the sub-steps of: obtaining a web page file corresponding to the first web page address; and parsing the web page file corresponding to the first web page address, and obtaining the title information of the first web page according to the parsing result.

In some alternative embodiments, the step of displaying the summary information of the first web page also includes the sub-step of: displaying a first card on an upper layer of the first user interface, and the first card containing the summary information of the first web page.

In some alternative embodiments, the method further includes the steps of: acquiring a first trigger signal corresponding to the first card; displaying a first floating window according to the first trigger signal, and the first floating window containing the first web page; or invoking a first application corresponding to the first web page according to the first trigger signal, and displaying the web page content of the first web page through the first application; or invoking a browser according to the first trigger signal; and displaying the first web page through the browser.

In some alternative embodiments, the method further includes the steps of: acquiring a second trigger signal corresponding to the first card, and switching the first card to display a second card according to the second trigger signal, the second card containing summary information of a second web page, and the second web page being a web page corresponding to a second web page address among the at least one web page address.

In some alternative embodiments, the method further includes the steps of: acquiring a switching instruction corresponding to the first floating window; and switching the first floating window to display a second floating window instead according to the switching instruction, the second floating window containing a second web page, and the second web page being a web page corresponding to a second web page address among the at least one web page address.

In some alternative embodiments, the method further includes the steps of: acquiring a full screen display instruction corresponding to the first web page; invoking a first application corresponding to the first web page according to the full screen display instruction for the first application to run in a foreground; and displaying the web page content of the first web page through the first application.

Optionally, the step of invoking a first application corresponding to the first web page according to the full screen display instruction can also include the sub-steps of: obtaining an application identifier corresponding to the key information in the first web page address from a second corresponding relationship according to the full screen display instruction, and determining an application identified by the obtained application identifier as the first application; the second corresponding relationship including a correspondence relationship between different key information and different application identifiers; and invoking the first application.

In some alternative embodiments, the method further includes the steps of: when a terminal does not install the first application corresponding to the first web page, invoking a browser to cause the browser to run in a foreground, and displaying the first web page through the browser.

According to a second aspect of the embodiments of the present disclosure, there is provided a device for displaying a web page content, the device including: a signal acquiring module configured to acquire a selection signal corresponding to a first web page address among at least one web page address displayed on a first user interface; a summary obtaining module configured to obtain summary information of a first web page corresponding to the first web page address, according to the first web page address; and a summary displaying module configured to display the summary information of the first web page.

In some embodiments, the summary information of the first web page includes identification information of the first web page, wherein the summary obtaining module includes an identification obtaining unit; and wherein the identification obtaining unit is configured to: extract key information in the first web page address, the key information including information associating with a publisher of a web page; and obtain identification information corresponding to the key information in the first web page address from a first correspondence relationship, and determine the obtained identification information as the identification information of the first web page, the first correspondence relationship including a correspondence relationship between different key information and different identification information.

In some embodiments, the summary information of the first web page includes title information of the first web page; wherein the summary obtaining module includes a title obtaining unit; and the title obtaining unit is configured to: obtain a web page file corresponding to the first web page address; and parse the web page file corresponding to the first web page address, and obtain the title information of the first web page according to the parsing result.

In some additional embodiments, the summary displaying module is configured to display a first card on an upper layer of the first user interface, and the first card contains the summary information of the first web page.

In some embodiments, the device further includes at least one of a floating-window displaying module, an application invoking module, or a browser invoking module, wherein the signal acquiring module is further configured to acquire a first trigger signal corresponding to the first card; the floating-window displaying module is configured to display a first floating window according to the first trigger signal, and the first floating window contains the first web page; the application invoking module is configured to invoke a first application corresponding to the first web page according to the first trigger signal, and display the web page content of the first web page through the first application; and the browser invoking module is configured to invoke a browser according to the first trigger signal; and display the first web page through the browser.

In yet additional embodiments, the signal acquiring module is further configured to acquire a second trigger signal corresponding to the first card, and the summary displaying module is further configured to switch the first card to display a second card instead of the first card according to the second trigger signal, the second card contains summary information of a second web page, and the second web page is a web page corresponding to a second web page address among the at least one web page address.

In some additional embodiments, the device can further include: an instruction acquiring module configured to acquire a switching instruction corresponding to the first floating window; wherein the floating-window displaying module is further configured to switch the first floating window to display a second floating window instead according to the switching instruction, the second floating window contains a second web page, and the second web page is a web page corresponding to a second web page address among the at least one web page address.

In some additional embodiments, the device can further include: an instruction acquiring module configured to acquire a full screen display instruction corresponding to the first web page; an application invoking module configured to invoke a first application corresponding to the first web page according to the full screen display instruction for the first application to run in a foreground; and display the web page content of the first web page through the first application.

In some additional embodiments, the application invoking module can be configured to: obtain an application identifier corresponding to the key information in the first web page address from a second corresponding relationship according to the full screen display instruction, and determine an application identified by the obtained application identifier as the first application; the second corresponding relationship including a correspondence relationship between different key information and different application identifiers; and invoke the first application.

In some additional embodiments, the device can further include: a browser invoking module configured to, when a terminal does not install the first application corresponding to the first web page, invoke a browser to cause the browser to run in a foreground, and display the first web page through the browser.

According to a third aspect of the embodiments of the present disclosure, there is provided a device for displaying a web page content, including: a processor; and a memory for storing instructions executable by the processor, wherein the processor is configured to: acquire a selection signal corresponding to a first web page address among at least one web page address displayed on a first user interface; obtain summary information of a first web page corresponding to the first web page address, according to the first web page address; and display the summary information of the first web page.

According to a fourth aspect of the embodiments of the present disclosure, there is provided a non-transitory computer readable storage medium having stored thereon a computer program, wherein the computer program is executed by a processor, the processor is caused to perform the method according to the first aspect.

The technical solutions provided by the embodiments of the present disclosure can include the following beneficial effects.

After the selection signal corresponding to a certain web page address is obtained, the summary information of the web page corresponding to the web page address can be acquired and displayed. In this way, upon receipt of a command for selecting a certain web page address from the user, before the web page content corresponding to the web page address is turned to, the summary information of the web page content is firstly acquired to be displayed to the user, so that the user can know about the main content of the web page corresponding to the web page address based on the summary information displayed, so as to determine whether it is necessary to turn to the web page with full content according to the main content. This method for displaying a web page content is more flexible and controllable, and can avoid a situation when after a page of no interest to the user is turned to, the user has to close the page. Thus, it can save processing resource and improve the user experience.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
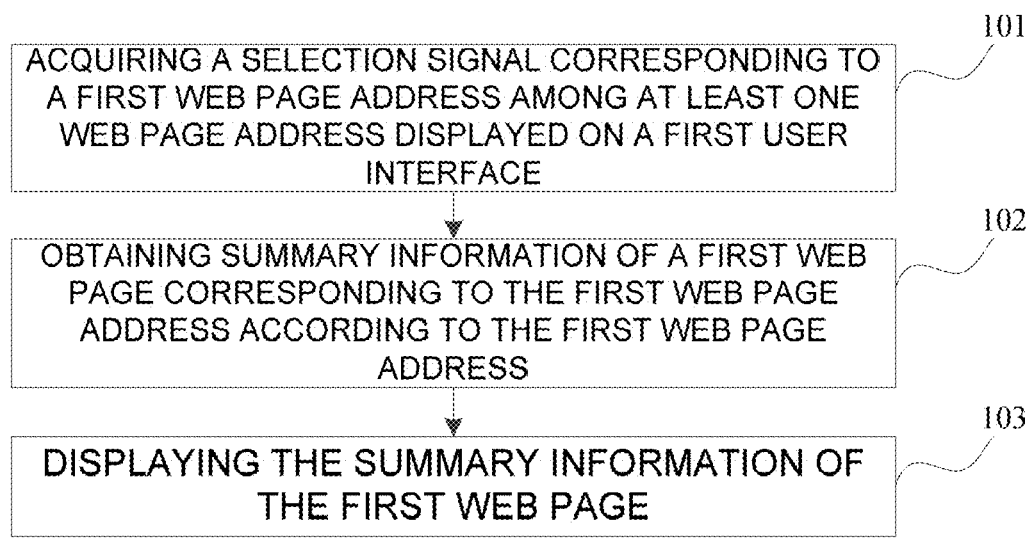
FIG. 1 is a flow chart illustrating a method for displaying a web page content according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The inventors of the present disclosure have recognized that, during the process of using a terminal application, the application can display URLs of some web pages to the user. For a URL displayed in the user interface of the application, if the user desires to view the web page content corresponding to the URL, the user can click the URL. Correspondingly, upon the application obtains the click operation signal corresponding to the URL, the web page corresponding to the URL can be displayed in a browser of the application. However, when the above operation jumps to a page that the user is not interested in, the page needs to be closed, which wastes processing resources.

The entity for performing the steps of the method provided by the embodiment of the present disclosure is a terminal. For example, the terminal can be an electronic device such as a mobile phone, a tablet computer, an e-book reader, a multimedia playback device, a PC (Personal Computer), a smart TV, or the like. The terminal has the ability to parse the web page address and obtain and display the web page corresponding to the web page address.

In an implementation, the entity for performing the steps in the embodiment of the present disclosure is an operating system of the terminal. In the embodiment of the present disclosure, the type of the operating system is not limited, such as an ANDROID™ operating system, an IOS™ operating system, a WINDOWS™ operating system, or other customized operating system based on the Android operating system.

In other implementation, the entity for performing the steps in the embodiment of the present disclosure is an application installed and running on the terminal, and the application can be an application that is inherently included in the system, or can be a third-party application.

In the method embodiment described below, the entity for performing the steps is an operating system for example. When the entity for performing the steps is an application, the application can perform the method for displaying a content provided by the embodiment of the present disclosure in a same or similar way.

In the related art, since the web page address is usually a character string, from the web page address, the user cannot know the web page content corresponding to the web page address, and can only view the web page content by clicking the web page address to trigger the terminal to display the corresponding web page. In addition, if the displayed web page content is not of interest to the user, the user has to close the display of the web page content.

In the technical solution provided by the embodiment of the present disclosure, after the selection signal corresponding to a certain web page address is obtained, the summary information of the web page corresponding to the web page address can be acquired and displayed. In this way, upon receipt of a command for selecting a certain web page address from the user, before the web page content corresponding to the web page address is turned to, the summary information of the web page content is firstly acquired to be displayed to the user, so that the user can know about the main content of the web page corresponding to the web page address based on the summary information displayed, so as to determine whether it is necessary to turn to the web page with full content according to the main content. This method for displaying a web page content is more flexible and controllable, and can avoid a situation when after a page of no interest to the user is turned to, the user has to close the page. Thus, it can save processing resources and also improve the user experience.

FIG. 1 is a flowchart of a method for displaying web page content according to an exemplary embodiment. In this embodiment, the entity for performing the steps is an operating system for example. The method can include the following steps 101-103.

In step 101, the system can acquire a selection signal corresponding to a first web page address among at least one web page address displayed on a first user interface.

The first user interface can be any one of the user interfaces displayed by the terminal, and at least one web page address is displayed in the first user interface. For example, the first user interface can be a user interface displayed by an application. In the embodiment of the present disclosure, the type of the application is not limited. For example, the application can be a third-party application such as a social application, an instant messaging application, an information application, or a shopping application.

Optionally, the web page address is a URL. For example, the first web page address is xxx.com/question/267566/answer/328566.

In the embodiment of the present disclosure, the operation manner for triggering selection signal with respect to a web page address is not limited. For example, the terminal has a touch display screen, and the user can trigger the selection signal with respect to a web page address by clicking, pressing, ticking, and circling and other operation manner. When the terminal does not have a touch screen display, for example, the user can move a cursor of a control device such as a mouse or a remote controller to the position of the web page address to be selected, and perform clicking or moving or other operation to select the web page address. In an example, a selection signal with respect to a web page address can be triggered through a long press operation.

After acquiring the selection signal, the operating system can identify the interface content of the first user interface, and determine the web page address at the location corresponding to the selection signal as the selected first web page address. Optionally, the operating system identifies the interface content of the first user interface utilizing a page content intercepting tool at the system level.

Figure 2:
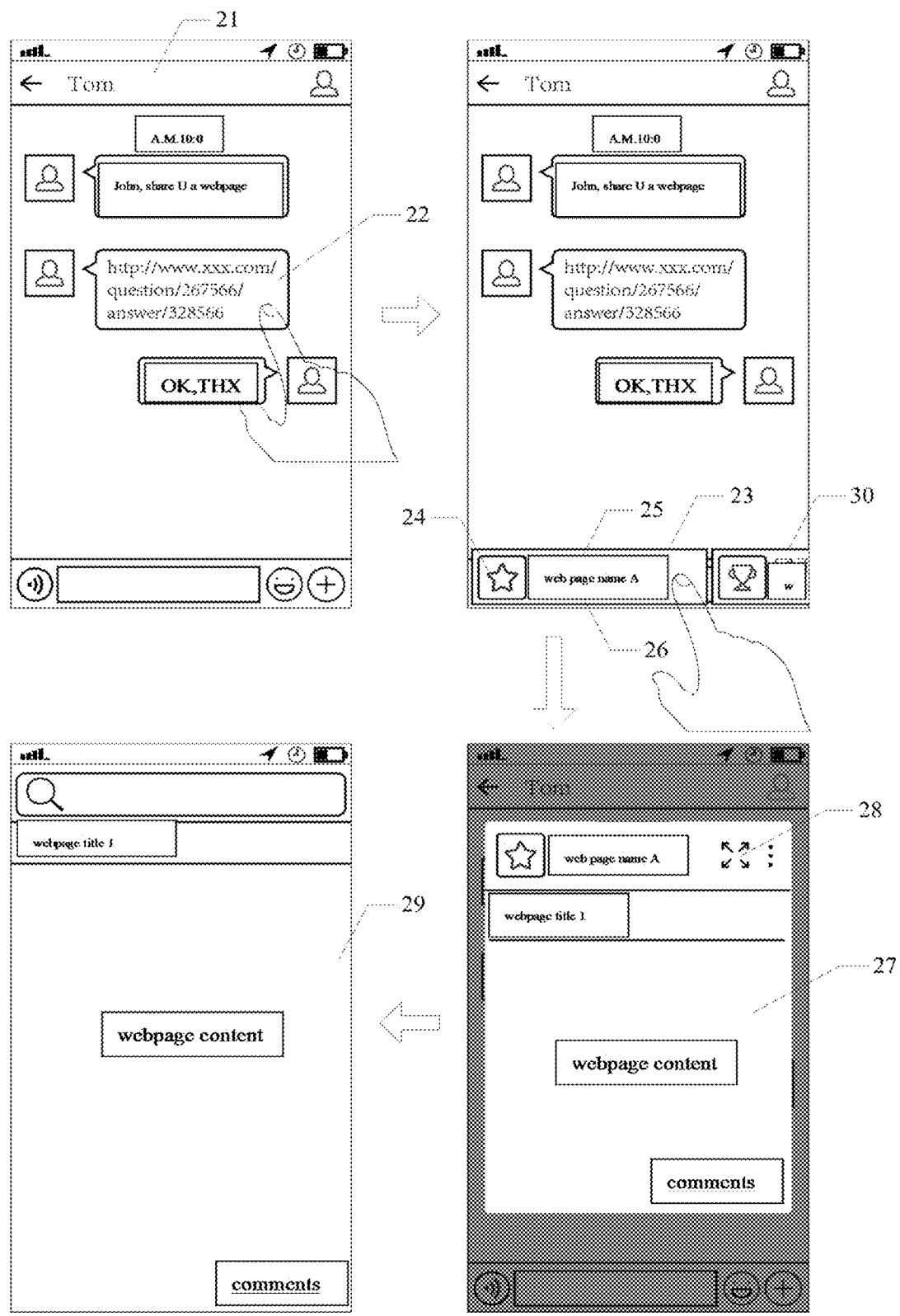
FIG. 2 is a schematic diagram illustrating an interface according to an exemplary embodiment.

In one example, as shown in FIG. 2, a first user can share a URL to a second user via an instant messaging application. The URL 22 can then be displayed in a conversation interface 21 of the second user's instant messaging application. Then, the second user can press or otherwise select the URL 22 so as to trigger a selection signal with respect to the URL 22.

In step 102, summary information of a first web page corresponding to the first web page address is obtained according to the first web page address.

After acquiring the first web page address selected by the user, the operating system acquires the summary information of the first web page corresponding to the first web page address. The summary information of the first web page is a content summary of the first web page, which is used to embody the main features of the first web page in a simple and general manner.

Optionally, the summary information of the first web page can include identification information regarding the first web page. The identification information of the first web page can then be used to uniquely indicate the publisher of the first web page. Generally speaking, different web page publishers have different identification information. For example, the identification information of the first web page can include: an icon of the first web page and/or a name of the first web page.

In an implementation, the operating system acquires the identification information of the first web page by:

1. extracting key information in the first web page address; and 2. obtaining the identification information corresponding to the key information in the first web page address from a first correspondence relationship, and determining or associating the obtained identification information as the identification information of the first web page.

The key information will often include information associating with the publisher of the web page. By taking the key information in the first web page address as an example, the key information includes information associating with the identifier of the publisher of the first web page. Optionally, the key information includes a server name or an IP address included in the web page address. For example, the first web page address is xxx.com/question/267566/answer/328566, the operating system can extract xxx as the key information.

The operating system can also be configured to pre-store a first correspondence relationship, wherein the first correspondence relationship can include a correspondence relationship between different key information and different identification information. Optionally, the first correspondence relationship can be stored in the form of a table including at least one entry, and wherein each entry includes a correspondence relationship between a set of key information and identification information. The first correspondence relationship can then be preset by the publisher of the operating system in the related storage device of the terminal. In this manner, when the operating system needs to use the first correspondence relationship, the first correspondence relationship can then be retrieved or read from the storage device. However, the terminal can also request to update the first correspondence relationship from a background server corresponding to the operating system periodically or irregularly so as to ensure the accuracy and timeliness of the first correspondence relationship stored in the terminal.

For example, the first correspondence relationship described above is as shown in Table 1 below.

TABLE 1

| key information | identification information (including a name of a web page and an icon) |
| --- | --- |
| xxx | name A, icon A |
| abc | name B, icon B |
| aaa | name C, icon C |
| ... | ... |

For example, after the operating system extracts the key information xxx from the first web page address, and searches from the first correspondence relationship and identifies that the identification information corresponding to the key information xxx is the name A and the icon A, the operating system determines the name A and the icon A as the identification information of the first web page. However, the first correspondence relationship shown in Table-1 above is merely exemplary and illustrative, and is not intended to limit the disclosure.

Of course, the above first correspondence relationship can also be stored in a background server corresponding to the operating system. The background server can then be configured to provide a background service for the operating system. The background server can be a server or a server cluster composed of multiple servers. For example, when the operating system is the operating system of the xx mobile phone manufacturer, the background server is the server operated and maintained by the xx mobile phone manufacturer. When the operating system needs to determine the summary information of the first web page corresponding to the first web page address, the operating system can send the first web page address to the background server, and the background server extracts the key information in the first web page address, searches from the first correspondence relationship for the identification information corresponding to the key information in the first web page address, determines the identification information searched out as the identification information of the first web page, and sends the identification information of the first web page to the operating system. Correspondingly, the operating system receives the identification information of the first web page sent by the background server. The background server searches for the identification information of the first web page corresponding to the first web page address, which can fully utilize the resources on the background service, thereby reducing the processing overhead of the terminal.

In addition, if the operating system does not search out the identification information corresponding to the key information in the first web page address in the first correspondence relationship, the operating system takes the common identification information as the identification information of the first web page. The common identification information can be preset, which can include a common icon and/or a common name. For example, the common icon is an icon containing the word "icon", and the common name is "current web page".

Optionally, the summary information of the first web page can include title information of the first web page, wherein the title information of the first web page can be a main summary of the web page content of the first web page.

In an implementation, the operating system can acquire the title information of the first web page by performing the following steps:

1. obtaining a web page file corresponding to the first web page address; and 2. parsing the web page file corresponding to the first web page address, and obtaining the title information of the first web page according to the parsing result.

The operating system can then request the web page file corresponding to the first web page address from the web page server according to the first web page address, and then parse the content of the web page file to obtain the title information of the first web page. Generally speaking, the web page file includes the title and the text of the web page content. The operating system can then parse the title of the web page content from the web page file corresponding to the first web page address, and determine the title obtained by the parsing as the title information of the first web page.

In addition, when the title of the web page content is not included in the web page file corresponding to the first web page address, the operating system can parse the text of the web page content from the web page file corresponding to the first web page address, and obtain the title information of the first web page according to the text. For example, the operating system can use the first sentence of the text as the title information of the first web page, or the first several, n number of, characters of the text as the title information of the first web page, where n is a positive integer. For example, the first 10 characters of the text can be taken as the title information of the first web page. In other implementation, when the title information of the first web page cannot be obtained by parsing, common title information can also be used as the title information of the first web page. The common title information can be preset. For example, the common title information is "untitled".

It should be noted that the summary information of the first web page acquired by the operating system can include only the identification information of the first web page, or can include only the title information of the first web page, and can also include both of the identification information and the title information of the first web page. The embodiment of the present disclosure is not limited thereto.

In step 103, the summary information of the first web page can be displayed.

After the operating system obtains the summary information of the first web page, the summary information of the first web page can then be displayed. Optionally, the operating system can display a first card on the upper or first visible layer of the first user interface, and then display the summary information of the first web page in the first card. To ensure that the first card is not obscured by other content in the screen, the first card can be displayed on the top layer of the screen, i.e. the display level of the first card is higher than the display level of other user interfaces displayed in the screen. The displaying area of the first card can be smaller than the area of the screen of the terminal. For example, the displaying area of the first card is one tenth of the area of the screen of the terminal in the form of a pop-up window. Alternatively, the displaying area of the first card can be smaller than the displaying area of the first user interface displayed by the first application. For example, the displaying area of the first card is one tenth of the displaying area of the first user interface. The displaying area of the first card can then also be preset, so that the summary information of the web page can be displayed more clearly and completely.

In addition, in the embodiment of the present disclosure, the display position of the first card is not limited. For example, the first card can be displayed at the bottom of the screen, or at the top of the screen, or in the middle of the screen. The display position of the first card can be preset by the technician, or can be customized by the user according to his or her preference. Optionally, the first card is displayed at the bottom of the screen, since, on the one hand, it is easier for the user to operate on the card, and on the other hand, it can avoid blocking the user's view of the first user interface as much as possible.

Referring to FIG. 2, after the user selects the URL 22, the operating system of the terminal acquires summary information of the web page corresponding to the URL 22, displays a card 23 at the bottom of the screen, and displays the summary information in the card 23, including the icon 24, the name 25 and the title 26 of the web page.

It should be noted that, in the embodiment of the present disclosure, the summary information of the web page can be displayed in the form of a card as an example. However, in another implementation, the summary information of the web page can also be displayed in the manner of a banner, a side window, a floating window, and the like, which additional display forms can vary in scope, and as such should not be limited to only the examples given in this disclosure.

Accordingly, in the solution provided by the embodiment of the present disclosure, after obtaining the selection signal corresponding to a certain web page address, the summary information of the web page corresponding to the web page address is obtained, and the summary information of the web page is displayed. After receiving the command of a user for selecting a certain web page address, before turning to the web page content corresponding to the web page address, the summary information of the web page content can be obtained and displayed to the user, such that the user can learn about the main content of the web page corresponding to the web page address based on the displayed summary information, so as to determine whether it is necessary to turn to the complete web page content page according to the main content. This method for displaying a webpage content is thus more flexible and controllable, and can avoid a situation when after a page of no interest to the user is turned to, the user has to close the page. Thus, it can save processing resource and improve the user experience.

Figure 3:
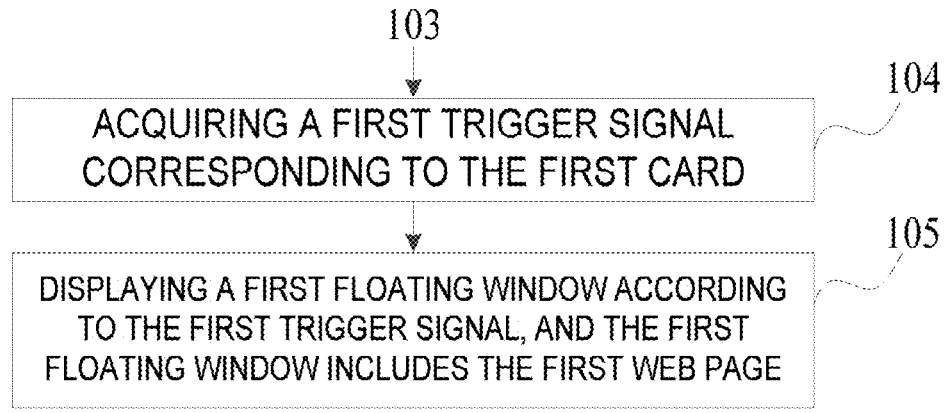
FIG. 3 is a flow chart illustrating a method for displaying a web page content according to an exemplary embodiment.

In an optional embodiment based on the embodiment of FIG. 1, as shown in FIG. 3, the step 103 can further include the following steps 104-105.

In step 104, a first trigger signal corresponding to the first card can be acquired.

After checking the summary information of the first web page displayed in the first card, if the user is interested in the web page content of the first web page, the user can perform an operation corresponding to the first card, to generate a trigger signal corresponding to the first card. In the embodiment of the present disclosure, the type of the first trigger signal is not limited, such as a single click signal, a double click signal, a sliding signal, a pressing signal, and the like.

In step 105, a first floating window can be displayed according to the first trigger signal, and the first floating window includes the first web page.

After the operating system acquires the first trigger signal corresponding to the first card, the displaying of the first card can be cancelled, and the first floating window can be displayed, with the first web page displayed in the first floating window. Optionally, the first floating window can be displayed on the top layer of the screen, that is, the display level of the first floating window can be higher than the display level of other user interfaces displayed in the screen.

The operating system can invoke a built-in browser to obtain the web page file corresponding to the first web page address. Then the browser parses the web page file corresponding to the first web page address to obtain the first web page, and renders and displays the first web page in the first floating window.

Referring to FIG. 2, the user clicks on the card 23, and accordingly, the terminal acquires a first trigger signal corresponding to the card 23. Thereafter, the terminal displays the floating window 27 and displays the corresponding web page in the floating window 27 for the user to view.

In the solution provided by the embodiment of the present disclosure, the floating window can be triggered through the card, and the web page can be displayed in the floating window, which can realize turning the display of the summary information of the web page to the display of the web page, with simple and convenient operation.

In other implementations, after the operating system acquires the first trigger signal corresponding to the first card, the first application corresponding to the first web page can also be invoked according to the first trigger signal, and the web page content of the first web page can be displayed through the first application.

In other implementations, after the operating system acquires the first trigger signal corresponding to the first card, the browser can be invoked according to the first trigger signal and the first web page can be displayed through the browser.

In the above implementations, turning the display of the summary information of the web page to the display of the web page can also be realized. In addition, how the first application can be invoked and how the browser can be invoked will be explained below.

Figure 4:
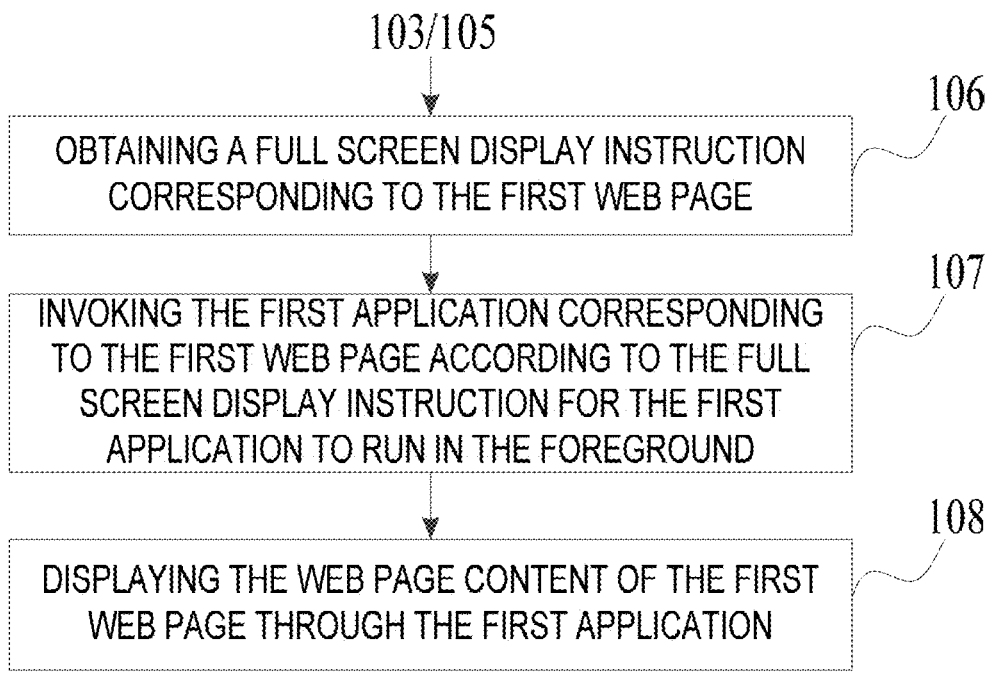
FIG. 4 is a flow chart illustrating a method for displaying a web page content according to an exemplary embodiment.

In another optional embodiment based on the embodiment of FIG. 1 or FIG. 3, as shown in FIG. 4, after the step 103 or step 105, the method can further include the following steps 106-108.

In step 106, a full screen display instruction corresponding to the first web page can be obtained.

In an implementation, after the user checks the summary information of the displayed first web page, if the user desires to view the web page content of the first web page in full screen, the full screen display instruction corresponding to the first web page can be triggered.

In other implementation, after the user views the first web page displayed in the first floating window, if the user desires to view the web page content of the first web page in full screen, the full screen display instruction corresponding to the first web page can be triggered.

In the embodiments of the present disclosure, the manner of triggering the full screen display instruction is not limited. For example, the user can perform a related operation on the summary information of the first web page to trigger a full screen display instruction; or can perform a related operation on the first floating window to trigger a full screen display instruction; or can trigger a full screen display instruction by voice, gesture, expression, etc.; or trigger a full screen display instruction by shaking the terminal or pressing a physical button on the terminal, and so on.

In an implementation, the first floating window includes a full screen display control, which can be an operation control for triggering a full screen display instruction, such as a button. When a trigger signal corresponding to the full screen display control in the first floating window can be acquired, the operating system acquires a full screen display instruction corresponding to the first web page.

In other implementations, when acquiring a preset operation signal corresponding to the first card, the operating system acquires a full screen display instruction corresponding to the first web page. Alternatively, when acquiring a trigger signal corresponding to a preset control in the first card, the operating system acquires a full screen display instruction corresponding to the first web page. The preset operation signal refers to an operation signal preset for triggering a full screen display instruction, such as clicking, sliding, or pressing and other operation signals.

The preset control refers to an operation control preset for triggering a full screen display instruction, such as a button. Similarly, if the summary information of the web page can be presented in other carrier such as a banner, a side window, a floating window, etc., the user can also perform related operations on the carrier to trigger a full screen display instruction.

In an example, the user triggers the full screen display instruction after viewing the web page displayed in the floating window. Referring to FIG. 2, when the user desires to view the web page content displayed in the floating window 27 in full screen, the user can click on a full screen display control 28 in the floating window 27.

In step 107, the first application corresponding to the first web page can be invoked according to the full screen display instruction for the first application to run in the foreground.

In the embodiments of the present disclosure, in a case where the terminal can be installed with the first application corresponding to the first web page, the operating system invokes the first application to display the web page content of the first web page in full screen through the first application. When the web publisher and the application publisher are the same publisher, it can be considered that the web page and the application correspond to each other.

Optionally, this step includes the following sub-steps.

1. The application identifier corresponding to the key information in the first web page address can be obtained from a second corresponding relationship according to the full screen display instruction, and the application identified by the obtained application identifier can be determined as the first application.

2. The first application can be invoked.

The second correspondence relationship includes a correspondence relationship between different key information and different application identifiers.

Optionally, the second correspondence relationship can be stored in a form of a table including at least one entry, and each entry includes a correspondence relationship between a set of key information and an application identifier. The second correspondence relationship can be preset by the publisher of the operating system in the related storage device of the terminal. When the operating system needs to use the second correspondence relationship, the second correspondence relationship can be read from the storage device. However, the terminal can also request to update the second correspondence relationship from the background server corresponding to the operating system periodically or irregularly to ensure the accuracy and timeliness of the second correspondence relationship stored in the terminal.

For example, the second correspondence relationship is as shown in Table 2 below.

TABLE 2

| key information | application identifier |
|---|---|
| Xxx | application A |
| Abc | application B |
| Aaa | application C |
| ... | ... |

For example, after the operating system extracts the key information xxx from the first web page address, and searches from the second correspondence relationship and identifies that the application identifier corresponding to the key information xxx is the application A, the operating system determines the application A as the first application. However, the second correspondence relationship shown in Table-2 above is merely exemplary and illustrative, and is not intended to limit the disclosure.

Of course, the second correspondence relationship can also be stored in a background server corresponding to the operating system. When the operating system needs to determine the first application corresponding to the first web page address, the operating system can send the first web page address to the background server, and the background server extracts the key information in the first web page address, searches from the second correspondence relationship for an application identifier corresponding to the key information in the first web page address, and sends the application identifier searched out to the operating system. Correspondingly, the operating system receives the application identifier sent by the background server, and determines the application identified by the received application identifier as the first application. The first application corresponding to the first web page address can be searched by the background server, which can fully utilize the resources on the background service and reduce the processing overhead of the terminal.

In addition, the first correspondence relationship and the second correspondence relationship described above can be integrated into one corresponding relationship, such as a third correspondence relationship. The third correspondence relationship includes a correspondence relationship between different key information, different application identifiers, and identification information of different web pages. Optionally, the third correspondence relationship can be stored in a form of a table including at least one entry, where each entry includes a correspondence relationship between a set of key information, an application identifier, and identification information of the web page. For example, the above third correspondence relationship is as shown in Table 3 below.

TABLE 3

| key information | application identifier | identification information (including a name of a web page and an icon) |
|---|---|---|
| xxx | application A | name A, icon A |
| abc | application B | name B, icon B |
| aaa | application C | name C, icon C |
| ... | ... | ... |

The terminal only needs to store the third correspondence relationship shown in Table-3 in the related storage device. Based on the third correspondence relationship shown in Table-3, the terminal can search for the identification information of the web page corresponding to the web page address, and can also search for the application identifier corresponding to the determined web page address. However, in other implementation, the third correspondence relationship can also be stored in a background server corresponding to the operating system, and the background server searches for the identification information and the application identifier of the web page corresponding to the web page address.

After the operating system determines the first application corresponding to the first web page address, the operating system detects whether the first application can be installed in the terminal. If the first application is already installed in the terminal, the operating system invokes the first application, for the first application to run in the foreground.

In step 108, the web page content of the first web page can be displayed through the first application.

In an implementation, when the operating system invokes the first application, the operating system sends a first invoking request to the first application, and the first invoking request carries the first web page address. The first application can be configured to request from the background server corresponding to the first application, a page turning mode corresponding to the first web page address, and display the target page according to the page turning mode corresponding to the first web page address. The target page contains the web page content of the first web page to achieve the purpose of displaying the web page content of the first web page in full screen.

The correspondence relationship between the different web page addresses and the different page turning modes can be recorded in the background server corresponding to the first application, and can be referred to as a fourth correspondence relationship in the embodiment of the present disclosure. The fourth correspondence relationship can be stored in a form of a table including at least one entry, and each entry includes a correspondence relationship between a set of web page address and a page turning mode. For example, the fourth correspondence relationship can be as shown in Table 4 below.

TABLE 4

| web page address | page turning mode |
|---|---|
| web page address A | mode 1 |
| web page address B | mode 2 |
| web page address C | mode 3 |
| ... | ... |

For example, after the first application receives the first invoking request, the first application sends a turning request to the background server. The turning request carries the first web page address, for example, the first web page address of web page address A. After the background server receives the turning request, the background server searches for the page turning mode corresponding to the first web page address from the fourth corresponding relationship, and sends the page turning mode searched out to the first application. For example, if the background server searches from the fourth correspondence relationship and identifies that the page turning mode corresponding to the web page address A is mode 1, the background server sends the mode 1 to the first application. After the first application receives the page turning mode corresponding to the first web page address, the first application displays the target page according to the page turning mode corresponding to the first web page address.

It should be noted that, the browser and the first application display the web page content in different ways. For example, to display the web page content corresponding to the first web page address, the browser displays the web page content corresponding to the first web page address in the following manner. The browser requests to obtain the web page file corresponding to the first web page address from the Internet according to the first web page address, parses the web page file corresponding to the first web page address to obtain the first web page, and then renders the first web page. While the first application displays the web page content corresponding to the first web page address in the following manner. The first application acquires a page turning mode corresponding to the first web page address, determines a target page to be displayed according to the page turning mode, and then displays the target page. Although the first web page and the target page both include the web page content corresponding to the first web page address, there are certain differences between the first web page and the target web page in that the first web page can be a web page, and the target web page can be a user interface of the application.

In addition, the page turning mode corresponding to the first web page address can be used to indicate page information of the target page that includes the web page content corresponding to the first web page address, such that the first application can accurately locate the target page to be displayed based on the page information of the target page, and then display the target page. In the ANDROID™ system, communication between the operating system and the first application can be implemented based on the intent, thereby invoking the first application to display the target page.

In other implementation, when the operating system invokes the first application, the first application sends a second invoking request to the first application, and the second invoking request carries a page turning mode corresponding to the first web page address. The first application can be configured to display a target page according to a page turning mode corresponding to the first web page address, and the target page includes the web page content of the first web page.

In this implementation, the page turning mode corresponding to the first web page address can be obtained by the operating system, and can be directly notified to the first application through the second invoking request, such that the first application directly displays the target page according to the page turning mode carried in the second invoking request.

The operating system can obtain the page turning mode in the following manner: requesting from the background server corresponding to the operating system the page turning mode corresponding to the first web page address. The background server corresponding to the operating system stores the correspondence relationship between the web page address and the page turning mode related to the first application, and the corresponding relationship can be the same as the fourth corresponding relationship described above, details of which will not be repeated herein. Optionally, if the background server corresponding to the operating system maintains the correspondence relationship between the web page address and the page turning mode, the background server corresponding to the operating system can maintain a plurality of correspondence relationships between the web page address and the page turning mode, which are related to a plurality of different applications, thereby supporting the page turning function for a plurality of different applications.

Optionally, the background server corresponding to the operating system stores a fifth correspondence relationship. The fifth correspondence relationship includes a correspondence relationship between the application, the web page address, and the page turning mode. The fifth correspondence relationship can also be stored in a form of a table. For example, the fifth correspondence relationship can be as shown in Table 5 below.

TABLE 5

| application | webpage address | page turning mode |
| --- | --- | --- |
| application A | webpage address A | mode 1 |
| | webpage address B | mode 2 |
| | webpage address C | mode 3 |
| | ... | ... |
| application B | webpage address H | mode 11 |
| | webpage address I | mode 12 |
| | webpage address J | mode 13 |
| | ... | ... |
| ... | ... | ... |

In addition, whether the correspondence relationship between the web page address and the page turning mode can be maintained in the background server corresponding to the first application, or the correspondence relationship between the web page address and the page turning mode can be maintained in the background server corresponding to the operating system. The server can update the above correspondence relationship periodically or irregularly to ensure the accuracy of the page turning.

For example, with reference to FIG. 2, after the user clicks on the full screen display control 28 in the floating window 27, the operating system invokes the corresponding application. Then the application runs in the foreground, and displays the web page content in the interface 29 of the application.

In addition, if the terminal does not install the first application corresponding to the first web page, the operating system invokes the browser to cause the browser to run in the foreground, and displays the first web page through the browser. The browser can be a built-in browser of the operating system or a third-party browser installed in the terminal, which can be not limited by the embodiment of the disclosure. After the operating system invokes the browser, the operating system sends the first web page address to the browser. Then the browser obtains the web page file corresponding to the first web page address and parses the web page file corresponding to the first web page address to obtain the first web page, and then renders and displays the first web page, to achieve the purpose of displaying the first web page in full screen.

In the solution provided by the embodiment of the present disclosure, after the full screen display instruction corresponding to the first web page can be acquired, the first application corresponding to the first web page can be invoked to run in the foreground and display the web page content of the first web page, to achieve the purpose of displaying the web page content of the first web page in full screen. Moreover, by utilizing the first application corresponding to the first web page, that is, the first application adapted to the first web page, to display the web page content of the first web page in full screen, can achieve a better display effect.

In an alternative embodiment provided based on the above embodiments, when a plurality of cards are displayed in the terminal screen, the function of card switching can be supported. The operating system acquires a second trigger signal corresponding to the first card, and switches the displaying of the first card to displaying of the second card according to the second trigger signal.

In the embodiment of the present disclosure, the type of the second trigger signal is not limited, such as a single click signal, a double click signal, a sliding signal, a pressing signal, and the like. The second trigger signal can be different from the first trigger signal. For example, the first trigger signal can be a single click signal, and the second trigger signal can be a sliding signal. The sliding signal can be used as a trigger signal for realizing card switching, which is more adapted for the user's operating habits.

Optionally, the second card includes summary information of a second web page, and the second web page can be a web page corresponding to a second web page address among the at least one web page address displayed in the first user interface. The second web page address can be different from the first web page address.

For example, when the first user interface includes a plurality of web page addresses, the operating system obtains the summary information corresponding to the first web page address after obtaining the selection signal corresponding to the first web page address, and displays the first card containing the summary information corresponding to the first web page. In addition to that, the operating system can also obtain summary information corresponding to a web page corresponding to other web page address than the first web page address among the plurality of web page addresses, and displays a card containing the summary information of the other web age. Optionally, a summary information of one web page can be displayed in each card, and summary information of different web pages can be displayed in different cards to be distinguished from one another. The other web page address can be any web page address other than the first web page address in the first user interface, or can be a partial web page address other than the first web page address in the first user interface, for example, corresponding to one or more web page addresses around the selection signal of the first web page address.

In addition, for the manner of obtaining the summary information of the second web page displayed in the second card, reference can be made to the description of the manner of obtaining the summary information of the first web page, details of which will not be repeated herein.

When a plurality of cards need to be displayed in the terminal screen, the first card corresponding to the first web page address selected by the user can be completely displayed, and another card (such as the second card) can be partially displayed. For example, as shown in FIG. 2, the terminal displays a portion of the card 30 in addition to the card 23 at the bottom of the screen, thereby prompting the user to trigger a card switching to view the content of the other card. For example, the user slides the card left and right to trigger a card switching. For example, the user triggers a leftward sliding signal corresponding to the card 23 to trigger switching of the card 23 to display the card 30 instead.

Optionally, corresponding to the function of switching a card, the function of switching a floating window can also be supported. The operating system acquires a switching instruction corresponding to the first floating window, and according to the switching instruction, switches the first floating window to display a second floating window instead. The second floating window includes a second web page. For the introduction of the second web page, reference can be made to the above description, details of which will not be repeated herein. In addition, each card can correspond to a floating window for displaying the content of the web page corresponding to the card.

In the embodiments of the present disclosure, the triggering manner of the switching instruction is not limited. For example, the user can perform a related operation on the first floating window to trigger a switching instruction, or can trigger a switching instruction by using a voice, a gesture, an expression, or the like, or triggering a switching instruction by shaking the terminal, pressing a physical button, and the like. For example, by performing a sliding operation on the first floating window, the switching instruction can be triggered, which can be more adapted for the user's operating habits.

In addition, in order to prompt the user of a switchable floating window, a prompt icon (such as an arrow) can be displayed beside the floating window, and some other floating windows can be displayed next to the floating window, which is not limited in the embodiment of the present disclosure.

In the solution provided by the embodiment of the present disclosure, the card switching function can realize convenient switching of the summary information of different web pages; and the floating window switching function can realize convenient switching and browsing of different web pages.

In another optional embodiment provided based on the above embodiment, when the operating system acquires a first closing instruction corresponding to the first card, the displaying of the first card can be cancelled.

The first closing instruction can be used to trigger the cancellation of the displaying of the first card. In one example, the first closing instruction can be a touch operation signal corresponding to a displaying area other than the displaying area of the first card in the screen. For example, as shown in FIG. 2, the user clicks on another displaying area other than the card 23, and the terminal cancels the displaying of the card 23.

Optionally, if there are a plurality of cards that can be switched, and the operating system acquires the first closing instruction corresponding to the first card, in addition to canceling the displaying of the first card, displaying of the other cards can also be cancelled as well. Alternatively, it is also possible to only cancel the displaying of the first card and leave the other cards in the displaying state.

In other implementation, the operating system can also cancel the displaying of the card corresponding to the web page address in the first user interface upon detecting that the first user interface can be closed. For example, the first user interface includes a first web page address, the upper layer of the first user interface displays a first card corresponding to the first web page address, and the operating system cancels displaying of the first card when detecting that the first user interface is closed. For another example, the first user interface includes a plurality of web page addresses, the upper layer of the first user interface displays a plurality of switchable cards corresponding to the web page addresses, and the operating system cancels displaying of the plurality of cards when detecting that the first user interface is closed.

In another optional embodiment provided based on the above embodiment, when the operating system acquires a second closing instruction corresponding to the first floating window, the operating system cancels the displaying of the first floating window.

The second closing instruction can be used to trigger the cancellation of the displaying of the first floating window. In one example, the second closing instruction can be a touch operation signal corresponding to a displaying area other than the displaying area of the first floating window in the screen. For example, as shown in FIG. 2, the user clicks on a displaying area other than the floating window 27, and the terminal cancels the displaying of the floating window 27.

Optionally, if there are a plurality of floating windows that are switchable, and the operating system acquires the second closing instruction corresponding to the first floating window, in addition to canceling the displaying of the first floating window, displaying of other floating windows can also be cancelled as well. Alternatively, it can also be possible to only cancel the displaying of the first floating window, and leave other floating windows in the displaying state.

In other implementations, each of the floating windows can also be provided with a closing control for triggering the closing of the floating window. Taking the first floating window as an example, the operating system cancels the displaying of the first floating window when acquiring the trigger signal corresponding to the closing control in the first floating window.

In the solution provided by the embodiment of the present disclosure, the closing function of the card and the floating window can also be provided to close the card or the floating window when it is not needed.

Also contemplated herein is a device embodiment of the present disclosure, which can be used to implement the method embodiments of the present disclosure. For details not disclosed in the device embodiments of the present disclosure, please refer to the method embodiments of the present disclosure.

Figure 5:
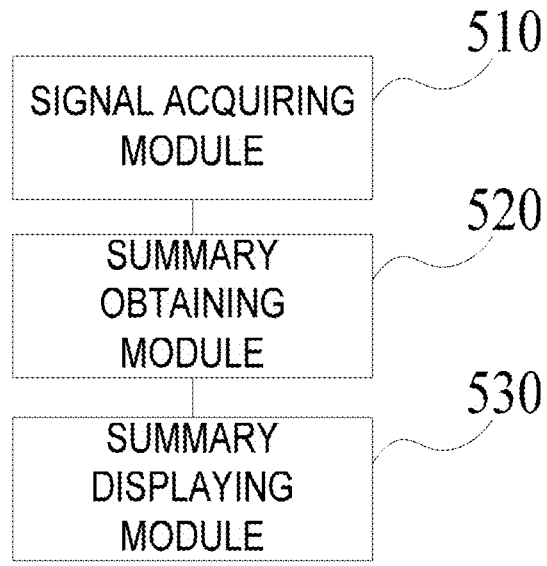
FIG. 5 is a block diagram illustrating a device for displaying a web page content according to an exemplary embodiment.

FIG. 5 is a block diagram of a device for displaying a web page content, according to an exemplary embodiment. The device can perform the above-described method embodiments, which can be implemented by hardware or can be implemented by hardware executing corresponding software. The device can include a signal acquiring module 510, a summary obtaining module 520 and a summary displaying module 530.

It is noted that the various device components, units, blocks, or portions may have modular configurations, or are composed of discrete components, but nonetheless may be referred to as "modules" in general. In other words, the "modules" or "units" referred to herein may or may not be in modular forms.

The signal acquiring module 510 can be configured to acquire a selection signal corresponding to a first web page address among at least one web page address displayed on a first user interface.

The summary obtaining module 520 can be configured to obtain summary information of a first web page corresponding to the first web page address, according to the first web page address.

The summary displaying module 530 can be configured to display the summary information of the first web page.

Accordingly, in the technical solution provided by the embodiments of the present disclosure, after the selection signal corresponding to a certain web page address can be obtained, the summary information of the web page corresponding to the web page address can be acquired and displayed. In this way, upon receipt of a command for selecting a certain web page address from the user, before the web page content corresponding to the web page address can be turned to, the summary information of the web page content can be firstly acquired to be displayed to the user, so that the user can know about the main content of the web page corresponding to the web page address based on the summary information displayed, so as to determine whether it is necessary to turn to the web page with full content according to the main content. This method for displaying a web page content can be more flexible and controllable, and can avoid a situation when after a page of no interest to the user is turned to, the user has to close the page. Thus, it can save processing resource and improve the user experience.

In an optional embodiment provided based on the embodiment as shown in FIG. 5, the summary information of the first web page includes identification information of the first web page. The summary obtaining module 520 includes an identification obtaining unit.

The identification obtaining unit can be configured to perform the following steps: extract key information in the first web page address, the key information including information associating with a publisher of a web page; and obtain identification information corresponding to the key information in the first web page address from a first correspondence relationship, and determine the obtained identification information as the identification information of the first web page, the first correspondence relationship including a correspondence relationship between different key information and different identification information.

In another optional embodiment provided based on the embodiment as shown in FIG. 5, the summary information of the first web page includes title information of the first web page. The summary obtaining module 520 includes a title obtaining unit.

The title obtaining unit can be configured to perform the following steps: obtain a web page file corresponding to the first web page address; and parse the web page file corresponding to the first web page address, and obtain the title information of the first web page according to the parsing result.

In another optional embodiment provided based on the embodiment as shown in FIG. 5, the summary displaying module 530 can be configured to display a first card on an upper layer of the first user interface, and the first card contains the summary information of the first web page.

Figure 6:
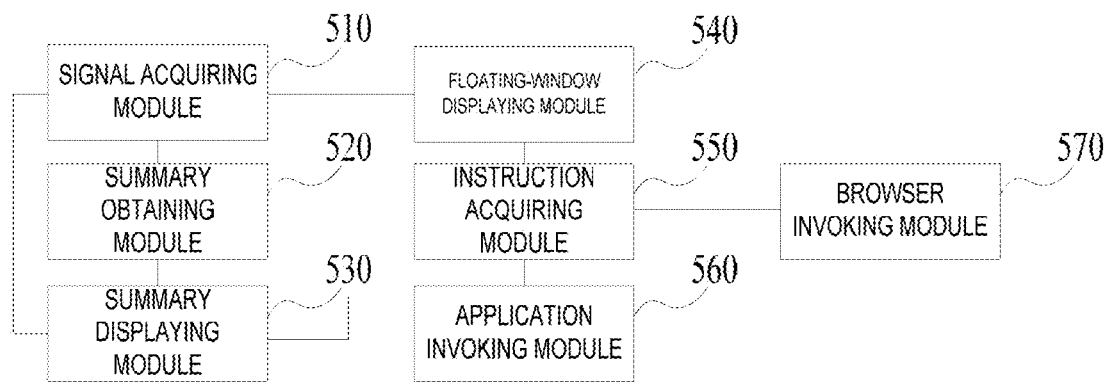
FIG. 6 is a block diagram illustrating a device for displaying a web page content according to another exemplary embodiment.

In another optional embodiment provided based on the embodiment as shown in FIG. 5, as shown in FIG. 6, the device further includes at least one of a floating-window displaying module 540, an application invoking module 560 and a browser invoking module 570.

The signal acquiring module 510 can be further configured to acquire a first trigger signal corresponding to the first card.

The floating-window displaying module 540 can be configured to display a first floating window according to the first trigger signal, and the first floating window contains the first web page.

The application invoking module 560 can be configured to invoke a first application corresponding to the first web page according to the first trigger signal, and display the web page content of the first web page through the first application.

The browser invoking module 570 can be configured to invoke a browser according to the first trigger signal; and display the first web page through the browser.

Optionally, the signal acquiring module 510 can be further configured to acquire a second trigger signal corresponding to the first card.

The summary displaying module 530 can be further configured to switch the first card to display a second card instead of the first card according to the second trigger signal, the second card contains summary information of a second web page, and the second web page can be a web page corresponding to a second web page address among the at least one web page address.

Optionally, the device further includes an instruction acquiring module 550.

The instruction acquiring module 550 can be configured to acquire a switching instruction corresponding to the first floating window.

The floating-window displaying module 540 can be further configured to switch the first floating window to display a second floating window instead according to the switching instruction, the second floating window contains a second web page, and the second web page can be a web page corresponding to a second web page address among the at least one web page address.

In another optional embodiment provided based on the embodiment as shown in FIG. 5, the device further includes: an instruction acquiring module 550 and an application invoking module 560.

The instruction acquiring module 550 can be configured to acquire a full screen display instruction corresponding to the first web page.

The application invoking module 560 can be configured to invoke a first application corresponding to the first web page according to the full screen display instruction for the first application to run in a foreground; and display the web page content of the first web page through the first application.

Optionally, the application invoking module 560 can be configured to: obtain an application identifier corresponding to the key information in the first web page address from a second corresponding relationship according to the full screen display instruction, and determine an application identified by the obtained application identifier as the first application; the second corresponding relationship including a correspondence relationship between different key information and different application identifiers; and invoke the first application.

Optionally, the device further includes a browser invoking module 570.

The browser invoking module 570 can be configured to, when a terminal does not install the first application corresponding to the first web page, invoke a browser to cause the browser to run in a foreground, and display the first web page through the browser.

It should be noted that, when the device provided by the above embodiments implements its function, the division of functional modules described above is only an example. In actual applications, the functions can be completed by different modules according to actual needs. The device can be divided into different functional modules to complete all or part of the functions described above.

With regard to the device in the above embodiments, the specific manner in which the respective modules perform the operations has been described in detail in the embodiment relating to the method, and will not be explained in detail herein.

An exemplary embodiment of the present disclosure also provides a device for displaying a web page content, which is capable of performing the method for displaying a web page content provided by the present disclosure. The device includes a processor; and a memory for storing instructions executable by the processor. The processor can then be configured to execute the following instructions or tasks:

acquire a selection signal corresponding to a first web page address among at least one web page address displayed on a first user interface;

obtain summary information of a first web page corresponding to the first web page address, according to the first web page address; and display the summary information of the first web page.

Optionally, the summary information of the first web page includes identification information of the first web page; and the processor can then be configured to:

extract key information in the first web page address, the key information including information associating with a publisher of a web page; and obtain identification information corresponding to the key information in the first web page address from a first correspondence relationship, and determine the obtained identification information as the identification information of the first web page, the first correspondence relationship including a correspondence relationship between different key information and different identification information.

Optionally, the summary information of the first web page includes title information of the first web page; and the processor can then be configured to:

obtain a web page file corresponding to the first web page address; and parse the web page file corresponding to the first web page address, and obtain the title information of the first web page according to the parsing result.

Optionally, the processor can then be configured to:

display a first card on an upper layer of the first user interface, and the first card containing the summary information of the first web page.

Optionally, the processor can also be configured to:

acquire a first trigger signal corresponding to the first card;

display a first floating window according to the first trigger signal, and the first floating window containing the first web page; or invoke a first application corresponding to the first web page according to the first trigger signal, and display the web page content of the first web page through the first application; or invoke a browser according to the first trigger signal; and display the first web page through the browser.

Optionally, the processor can be configured to:

acquire a second trigger signal corresponding to the first card, and switch the first card to display a second card instead according to the second trigger signal, the second card containing summary information of a second web page, and the second web page being a web page corresponding to a second web page address among the at least one web page address.

Optionally, the processor can be configured to:

acquire a switching instruction corresponding to the first floating window; and switch the first floating window to display a second floating window instead according to the switching instruction, the second floating window containing a second web page, and the second web page being a web page corresponding to a second web page address among the at least one web page address.

Optionally, the processor can be configured to:

acquire a full screen display instruction corresponding to the first web page;

invoke a first application corresponding to the first web page according to the full screen display instruction for the first application to run in a foreground;

and display the web page content of the first web page through the first application.

Optionally, the processor can be configured to:

obtain an application identifier corresponding to the key information in the first web page address from a second corresponding relationship according to the full screen display instruction, and determine an application identified by the obtained application identifier as the first application; the second corresponding relationship including a correspondence relationship between different key information and different application identifiers; and invoke the first application.

Optionally, the processor can be configured to:

when a terminal does not install the first application corresponding to the first web page, invoke a browser to cause the browser to run in a foreground, and display the first web page through the browser.

Figure 7:
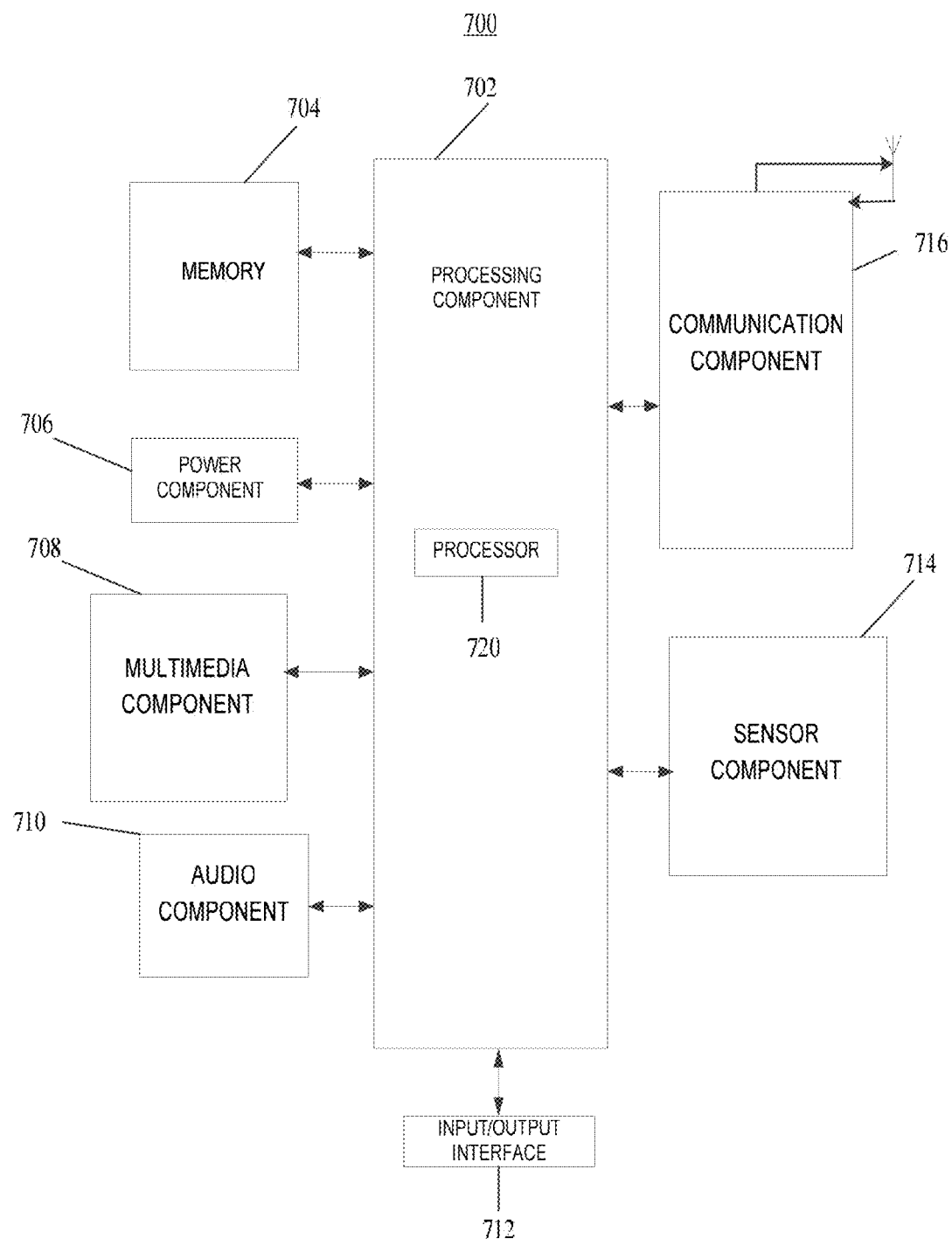
FIG. 7 is a block diagram of a device according to an exemplary embodiment.

FIG. 7 illustrates a block diagram of a device 700 according to an exemplary embodiment. For example, the device 700 can be a mobile phone, a computer, a digital broadcast terminal, a messaging device, a gaming console, a tablet, a medical device, exercise equipment, a personal digital assistant, and the like.

The device 700 can include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the device 700, such as the operations associated with display, telephone calls, data communications, camera operations, and recording operations. The processing component 702 can include one or more processors 720 to execute instructions, to perform all or part of the steps of the above method. Moreover, the processing component 702 can include one or more modules which facilitate the interaction between the processing component 702 and other components. For instance, the processing component 702 can include a multimedia module to facilitate the interaction between the multimedia component 708 and the processing component 702.

The memory 704 can be configured to store various types of data to support the operation of the device 700. Examples of such data include instructions for any applications or methods operated on the device 700, contact data, phonebook data, messages, pictures, video, etc. The memory 704 can be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 can include a power management system, one or more power sources, and any other components associated with the generation, management, and distribution of power in the device 700.

The multimedia component 708 includes a screen providing an output interface between the device 700 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 708 includes a front camera and/or a rear camera. The front camera and the rear camera can receive an external multimedia datum while the device 700 is in an operation mode, such as a photographing mode or a video mode. Each of the front camera and the rear camera can be a fixed optical lens system or have focus and optical zoom capability.

The audio component 710 can be configured to output and/or input audio signals. For example, the audio component 710 includes a microphone ("MIC") configured to receive an external audio signal when the device 700 is in an operation mode, such as a call mode, a recording mode, and a voice recognition mode. The received audio signal can be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons can include, but are not limited to, a home button, a volume button, a starting button, and a locking button.

The sensor component 714 includes one or more sensors to provide status assessments of various aspects of the device 700. For instance, the sensor component 714 can detect an open/closed status of the device 700, relative positioning of components, e.g., the display and the keypad, of the device 700, a change in position of the device 700 or a component of the device 700, a presence or absence of user contact with the device 700, an orientation or an acceleration/deceleration of the device 700, and a change in temperature of the device 700. The sensor component 714 can include a proximity sensor configured to detect the presence of nearby objects without any physical contact. The sensor component 714 can also include a light sensor, such as a CMOS or CCD image sensor, for use in imaging applications. In some embodiments, the sensor component 714 can also include an accelerometer sensor, a gyroscope sensor, a magnetic sensor, a pressure sensor, or a temperature sensor.

The communication component 716 can be configured to facilitate communication, wired or wirelessly, between the device 700 and other devices. The device 700 can access a wireless network based on a communication standard, such as WiFi, 2G, or 3G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 700 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, to perform the above method for displaying a web page content.

In exemplary embodiments, there is also provided a non-transitory computer-readable storage medium including instructions, such as included in the memory 704, executable by the processor 720 in the device 700 to perform the above method for displaying a web page content. For example, the non-transitory computer-readable storage medium can be a ROM, a RAM, a CD-ROM, a magnetic tape, a floppy disc, an optical data storage device, and the like.

A non-transitory computer readable storage medium, when instructions (or computer program) in the storage medium are executed by the processor of the device 700, causes the device 700 to perform the above method for displaying a web page content.

It should be understood that the term "a plurality" as referred to herein means two or more. The term "and/or", describing the association relationship of the associated objects, indicates that there can be three kinds of relationships. For example, by "A and/or B", it can indicate that there are three cases where only A exists, both A and B exist, and only B exists. The character "/" generally indicates that the contextual object is an "or" relationship.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A method for displaying a web page content, comprising:
    acquiring a selection signal corresponding to a first web page address among at least one web page address displayed on a first user interface of an instant messaging application;
    obtaining summary information including identification information of a first web page corresponding to the first web page address by:
        extracting key information including publisher information of the first web page in the first web page address; and
        obtaining, according to the key information of the first web page, and from a first tabulated correspondence relationship between different pieces of key information and respective pieces of web-page identification information, a piece of web-page identification information corresponding to the key information of the first web page; and
        determining the obtained piece of web-page identification information as the identification information of the first web page;
    displaying a first card having the summary information of the first web page on the first user interface;
    acquiring a first trigger signal corresponding to the first card;
    acquiring a second trigger signal corresponding to the first card;
    displaying a second card on the first user interface according to the second trigger signal, the second card containing summary information of a second web page corresponding to a second web page address among the at least one web page address;
    obtaining an application identifier corresponding to the key information from a second tabulated corresponding relationship between different key information and different application identifiers according to a full screen display instruction;
    determining an application identified by the obtained application identifier as a first application;
    invoking the first application corresponding to the first web page according to the first trigger signal; and
    displaying the web page content of the first web page through the first application according to a page turning mode corresponding to the first web page address, wherein the page turning mode is selected from a tabulated correspondence relationship between different web page addresses and different page turning modes.

2. The method according to claim 1, wherein the summary information of the first web page comprises title information of the first web page; and wherein said obtaining summary information of the first web page further comprises:
    obtaining a web page file corresponding to the first web page address;
    parsing the web page file corresponding to the first web page address; and
    obtaining the title information of the first web page according to the parsing result.

3. The method according to claim 1, wherein said displaying the first card further comprises:
    displaying the first card on an upper layer of the first user interface.

4. The method according to claim 1, further comprising:
    displaying a first floating window containing the first web page.

5. The method according to claim 4, further comprising:
    acquiring a switching instruction corresponding to the first floating window; and
    displaying a second floating window according to the switching instruction, the second floating window containing the second web page.

6. The method according to claim 1, further comprising:
    invoking a browser to cause the browser to run in a foreground when a terminal does not have the first application corresponding to the first web page installed; and
    displaying the first web page through the browser.

7. A device configured to display a web page content, comprising:
    a processor; and
    a memory device, accessible by the processor, the memory containing instructions executable by the processor,
    wherein the instructions include executable commands instructing the processor to perform:
    acquiring a selection signal corresponding to a first web page address among at least one web page address displayed on a first user interface of an instant messaging application;
    obtaining summary information including identification information of a first web page corresponding to the first web page address by:
        extracting key information including publisher information of the first web page in the first web page address; and
        obtaining, according to the key information of the first web page, and from a first tabulated correspondence relationship between different pieces of key information and respective pieces of web-page identification information, a piece of web-page identification information corresponding to the key information of the first web page; and
        determining the obtained piece of web-page identification information as the identification information of the first web page;

displaying a first card having the summary information of the first web page on the first user interface;

acquiring a first trigger signal corresponding to the first card;

acquiring a second trigger signal corresponding to the first card;

displaying a second card on the first user interface according to the second trigger signal, the second card containing summary information of a second web page corresponding to a second web page address among the at least one web page address;

obtaining an application identifier corresponding to the key information from a second tabulated corresponding relationship between different key information and different application identifiers according to a full screen display instruction;

determining an application identified by the obtained application identifier as a first application;

invoking the first application corresponding to the first web page according to the first trigger signal; and displaying the web page content of the first web page through the first application according to a page turning mode corresponding to the first web page address, wherein the page turning mode is selected from a tabulated correspondence relationship between different web page addresses and different page turning modes.

8. The device according to claim 7, wherein the summary information of the first web page comprises title information of the first web page, and wherein the instructions further include executable commands instructing the processor to:

obtain the summary information of the first web page corresponding to the first web page address by:

obtaining a web page file corresponding to the first web page address;

parsing the web page file corresponding to the first web page address; and obtaining the title information of the first web page according to the parsing result.

9. The device according to claim 7, wherein said displaying the first card comprises:

displaying the first card on an upper layer of the first user interface.

10. The device according to claim 7, wherein the instructions further include executable commands instructing the processor to:

invoke a browser to cause the browser to run in a foreground when a terminal does not have the first application corresponding to the first web page installed; and display the first web page through the browser.

11. The device according to claim 7, wherein the instructions further include executable commands instructing the processor to:

displaying a first floating window containing the first web page.

12. The device according to claim 11, wherein the instructions further include executable commands instructing the processor to:

acquire a switching instruction corresponding to the first floating window; and displaying a second floating window according to the switching instruction, the second floating window containing the second web page.

13. A non-transitory computer-readable medium having instructions stored thereon for execution by one or more processing circuits to perform a method for displaying a web page content comprising:

acquiring a selection signal corresponding to a first web page address among at least one web page address displayed on a first user interface of an instant messaging application;

obtaining summary information including identification information of a first web page corresponding to the first web page address by:

extracting key information including publisher information of the first web page in the first web page address; and obtaining, according to the key information of the first web page, and from a first tabulated correspondence relationship between different pieces of key information and respective pieces of web-page identification information, a piece of web-page identification information corresponding to the key information of the first web page; and determining the obtained piece of web-page identification information as the identification information of the first web page;

displaying a first card having the summary information of the first web page on the first user interface;

acquiring a first trigger signal corresponding to the first card;

acquiring a second trigger signal corresponding to the first card;

displaying a second card on the first user interface according to the second trigger signal, the second card containing summary information of a second web page corresponding to a second web page address among the at least one web page address;

obtaining an application identifier corresponding to the key information from a second tabulated corresponding relationship between different key information and different application identifiers according to a full screen display instruction;

determining an application identified by the obtained application identifier as a first application;

invoking the first application corresponding to the first web page according to the first trigger signal; and displaying the web page content of the first web page through the first application according to a page turning mode corresponding to the first web page address, wherein the page turning mode is selected from a tabulated correspondence relationship between different web page addresses and different page turning modes.

14. A mobile phone comprising the non-transitory computer-readable medium to claim 13, further comprising the one or more processing circuits and a display screen configured to display the summary information of the first web page content and the summary information of the second web page content to a user, prior to displaying the first web page or the second web page according to user selection.

* * * * *